(12) United States Patent
Tsujita

(10) Patent No.: US 6,604,416 B2
(45) Date of Patent: Aug. 12, 2003

(54) TIRE MONITORING TRANSMITTER WITH VARIOUS OPERATION MODES

(75) Inventor: Yasuhisa Tsujita, Ogaki (JP)

(73) Assignee: Pacific Industrial Co., Ltd., Gifu Ken (JP)

( * ) Notice: Subject to any disclaimer, the term of this patent is extended or adjusted under 35 U.S.C. 154(b) by 0 days.

(21) Appl. No.: 10/170,959

(22) Filed: Jun. 13, 2002

(65) Prior Publication Data

US 2003/0110851 A1 Jun. 19, 2003

(30) Foreign Application Priority Data

Dec. 17, 2001 (JP) ........................................ 2001-383458
Mar. 13, 2002 (JP) ........................................ 2002-068597

(51) Int. Cl.$^7$ ............................................... B60C 23/04
(52) U.S. Cl. ........................ 73/146.5; 73/146; 340/445
(58) Field of Search .............................. 73/146, 146.2, 73/146.3, 146.4, 146.5, 146.8; 340/445, 446, 442, 447

(56) References Cited

U.S. PATENT DOCUMENTS

| | | | | |
|---|---|---|---|---|
| 5,844,130 A | * | 12/1998 | Hilgart et al. | 73/146.5 |
| 5,977,870 A | * | 11/1999 | Rensel et al. | 340/447 |
| 6,278,361 B1 | * | 8/2001 | Magiawala et al. | 340/438 |
| 6,292,096 B1 | * | 9/2001 | Munch et al. | 340/445 |
| 6,359,556 B1 | * | 3/2002 | Katou | 340/506 |
| 6,384,720 B1 | * | 5/2002 | Juzswik et al. | 340/442 |
| 6,450,021 B1 | * | 9/2002 | Katou et al. | 73/146.5 |
| 6,469,621 B1 | * | 10/2002 | Vredevoogd et al. | 340/445 |
| 6,502,034 B1 | * | 12/2002 | Miller | 701/301 |
| 6,505,507 B1 | * | 1/2003 | Imao et al. | 73/146.5 |
| 6,518,877 B1 | * | 2/2003 | Starkey et al. | 340/447 |
| 6,531,957 B1 | * | 3/2003 | Nysen | 340/10.1 |

* cited by examiner

Primary Examiner—Edward Lefkowitz
Assistant Examiner—Anore Allen
(74) Attorney, Agent, or Firm—Fish & Richardson P.C.

(57) ABSTRACT

A transmitter of a tire condition monitoring apparatus has a pressure sensor, a transmitting circuit, and a transmission controller. The pressure sensor measures the air pressure of a tire. The transmitting circuit wirelessly transmits data indicating the measurement at a variable bit rate. The transmission controller controls the transmitting circuit). More specifically, the transmission controller varies the bit rate depending on the traveling speed of a vehicle, which is detected by a vehicle speed sensor. The transmission controller then causes the transmitting circuit to transmit data at the varied bit rate. Accordingly, regardless of the operation mode of the vehicle, the data is transmitted at an optimal bit rate.

18 Claims, 6 Drawing Sheets

| Vehicle Traveling Speed [km/h] | Time of Tire Rotation Cycle [msec] | Time of Receivable Area A [msec] | Time of Receivable Area B [msec] | Receivability at 1kbps | Receivability at 20kbps |
|---|---|---|---|---|---|
| 40 | 184.7 | 92.3 | 84.0 | Receivable | Receivable |
| 80 | 92.3 | 46.2 | 42.0 | Receivable | Receivable |
| 100 | 73.9 | 36.9 | 33.6 | Unreceivable | Receivable |
| 120 | 61.6 | 30.8 | 28.0 | Unreceivable | Receivable |
| 150 | 49.3 | 24.6 | 22.4 | Unreceivable | Receivable |
| 200 | 36.9 | 18.5 | 16.8 | Unreceivable | Receivable |
| 300 | 24.6 | 12.3 | 11.2 | Unreceivable | Receivable |

TIRE MONITORING TRANSMITTER WITH VARIOUS OPERATION MODES

BACKGROUND OF THE INVENTION

The present invention relates to apparatuses and methods for monitoring the condition of a tire, and, more particularly, to apparatuses and methods for wirelessly monitoring the condition of a tire, such as air pressure, to enable a driver to monitor that tire condition in a passenger compartment.

Wireless tire condition monitoring apparatuses have been proposed for enabling a driver of a vehicle to monitor the conditions of the tires in the passenger compartment. A typical wireless tire condition monitoring apparatus includes a plurality of transmitters and a receiver. Each of the transmitters is associated with a different one of the tires and is installed in the associated tire. The receiver is installed in the body frame of the vehicle. Each transmitter has a tire condition sensor that measures parameters indicating the condition of the associated tire, such as the air pressure and the temperature of the interior of the tire, and a transmitting circuit that wirelessly transmits data based on the measurement to the receiver. The receiver receives the data from the transmitter via a receiving antenna. The receiver then indicates the condition of the tire on a display, which is located, for example, near the driver seat in the passenger compartment.

In this apparatus, each transmitter transmits data indicating the condition of the associated tire at a constant bit rate, regardless of the operational mode of the vehicle, or regardless of whether the vehicle is moving or stopped. The battery of the vehicle powers the receiver. Thus, to save the battery power, a receiving circuit of the receiver is periodically turned on and off, instead of being maintained in a constantly turned-on state, when the engine is stopped. That is, the receiver operates intermittently as long as the engine is stopped.

The positions of the transmitters relative to the receiving antenna change in accordance with the movement of the tires. Thus, when one of the transmitters transmits a radio wave to the receiver, the level of voltage induced in the receiving antenna by the radio wave changes in relation to the rotational angle of the associated tire, with reference to FIG. 4. The change of the induced voltage level (hereafter, "an induced voltage pattern") is determined by factors such as the type of the vehicle, the positions of the tires, the types of the tires and wheels, and the location of the receiving antenna. The induced voltage pattern includes an induced voltage area in which the induced voltage dose not reach a level corresponding to a minimum receiving sensitivity of the receiver (hereafter, "a null point").

That is, the receiver accurately receives data from the transmitters only when the induced voltage level does not correspond to the null point, or is in a receivable induced voltage area. Further, if the rotational speed of the tires is increased due to acceleration of the vehicle, the time for which the induced voltage level remains in the receivable induced voltage area is shortened. That is, the higher the rotational speed of the tires becomes, the more difficult it becomes for the receiver to accurately receive data from the transmitters. In other words, if the data transmitting time exceeds the time for which the induced voltage level remains in the receivable induced voltage area, the receiver cannot completely receive the data from the transmitters.

To solve this problem, for example, the transmitting power of each transmitter may be raised to eliminate the null point. However, the transmitting power is restricted by radio wave regulations. Further, to prolong the lives of the batteries that power the transmitters, it is undesirable to raise the transmitting power of the transmitters. It is thus impossible to raise the transmitting power of each transmitter to a level sufficient for eliminating the null point.

Alternatively, the null point may be eliminated by optimizing the location of the receiving antenna. In this case, the induced voltage pattern of the receiving antenna is affected by factors such as the type of the vehicle, the positions of the tires, and the types of the tires and wheels. That is, the optimization of the location of the receiving antenna needs a large-scale evaluation and is thus infeasible. Further, the design of the vehicle may make it impossible to install the receiving antenna at an optimal location. In addition, it is desirable that the location of the receiving antenna be selected freely. It is thus impossible to eliminate the null point by optimizing the location of the receiving antenna.

It is also possible to shorten the data transmitting time of each transmitter to reliably transmit data even when the vehicle traveling speed is relatively high. The data transmitting time may be shortened by decreasing the bit count (the data length) of transmitted data or increasing the bit rate of the transmitted data. However, since the above-described apparatus employs a minimum bit count for transmitted data, the bit count of the transmitted data cannot be further decreased. Thus, the data transmitting time must be shortened by increasing the bit rate of the transmitted data. In this case, the increased bit rate must be selected to sufficiently shorten the data transmitting time, compared to the time for which the induced voltage level remains in the receivable induced voltage area, even if the induced voltage pattern includes the null point. Further, data transmission can be further stabilized by repeating the data transmission several times in a single transmission cycle, in addition to the increasing of the bit rate.

However, as described, the receiver operates intermittently to save the battery power when the engine is stopped. Thus, if the data is transmitted at a relatively high bit rate in a relatively short time when the engine is stopped, the receiver cannot stably receive the transmitted data unless the receiving circuit is turned off only for a relatively short time, or unless the receiving circuit remains turned on for a sufficiently long time, during the intermittent operation. In contrast, to save the battery power when the engine is stopped, the receiver needs to be turned on for a relatively short time during the intermittent operation. It is thus impossible to prolong the time for which the receiving circuit remains turned on and save the battery power at the same time.

SUMMARY OF THE INVENTION

Accordingly, it is an objective of the present invention to provide an apparatus and a method for monitoring the condition of a tire that transmit data at an optimal bit rate regardless of the operational mode of a vehicle, or regardless of whether the vehicle is moving or stopped.

To achieve the foregoing and other objectives and in accordance with the purpose of the present invention, the invention provides a transmitter of an apparatus for monitoring the condition of a tire attached to a vehicle. The transmitter includes a tire condition sensor, a transmitting circuit and a controller. The tire condition sensor measures a parameter indicting the condition of the tire. The transmitting circuit wirelessly transmits, at a variable bit rate, data representing the measured parameter. The controller controls the variable bit rate of the data transmitted by the transmitting circuit.

The present invention also provides a method for monitoring the condition of a tire attached to a vehicle. The method includes the steps of measuring a parameter indicating the condition of the tire, wirelessly transmitting, at a variable bit rate, data representing the measured parameter, and varying the variable bit rate of the transmitted data in accordance with a traveling speed of the vehicle.

The present invention further provides a method for monitoring the condition of a tire attached to a vehicle. The method includes the steps of measuring a parameter indicating the condition of the tire, and wirelessly transmitting data representing the measured parameter at more than one bit rate.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objectives and advantages thereof, may best be understood by reference to the following description of the presently preferred embodiments together with the accompanying drawings in which.

DETAILED DESCRIPTION OF THE PREFERRED EMBODIMENTS

An embodiment of the present invention, or a wireless tire condition monitoring apparatus 1, will now be described with reference to FIGS. 1 to 6.

Figure 1:
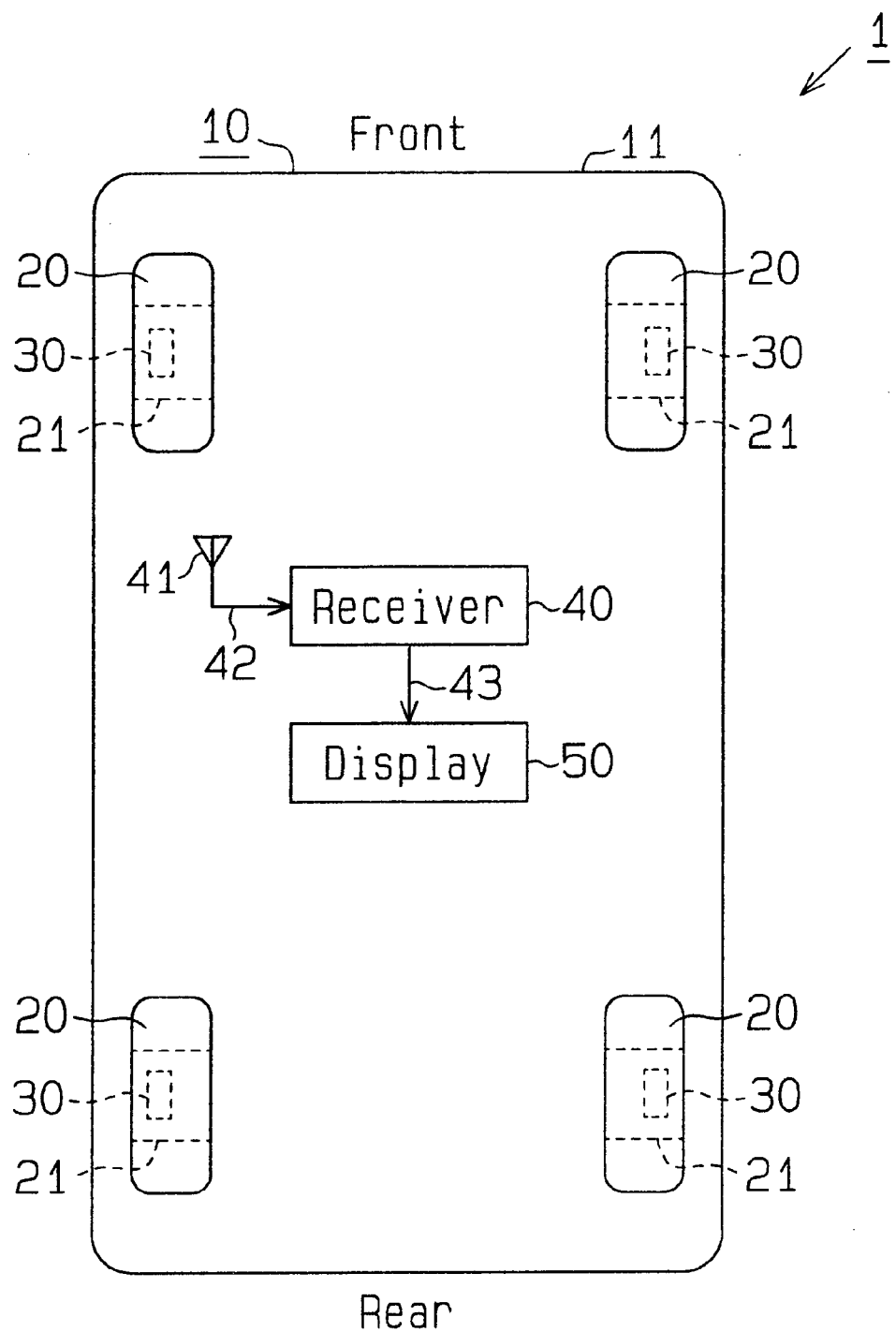
FIG. 1 is a block diagram showing a tire condition monitoring apparatus according to an embodiment of the present invention.

With reference to FIG. 1, the tire condition monitoring apparatus 1 includes four transmitters 30 and a single receiver 40. Each of the transmitters 30 is associated with a different one of four tires 20 of a vehicle 10. The receiver 40 is installed in a body frame 11 of the vehicle 10.

Each transmitter 30 is fixed to a wheel 21 such that the transmitter 30 is located in the associated tire 20. Each transmitter 30 measures a parameter indicating the condition of the associated tire 20, in this embodiment the air pressure of the tire 20. The transmitter 30 then wirelessly transmits data including air pressure data, which is obtained from the measurement, to the receiver 40.

The receiver 40 is installed at a predetermined location in the body frame 11 and is powered by, for example, a battery (not shown) located in the vehicle 10. A receiving antenna 41 is connected to the receiver 40 by a cable 42. It is preferred that the cable 42 be a coaxial cable, which is hardly affected by a noise. The receiver 40 receives a signal from each of the transmitters 30 by the receiving antenna 41. More specifically, when one of the transmitters 30 wirelessly transmits data to the receiver 40, the receiving antenna 41 induces voltage in accordance with the electric field strength of a radio wave received from the transmitter 30. The receiving antenna 41 then sends a signal indicating the induced voltage to the receiver 40.

A display 50 is located at a position visible from the driver of the vehicle 10, for example, in the passenger compartment. The display 50 is connected to the receiver 40 by a cable 43.

Figure 2:
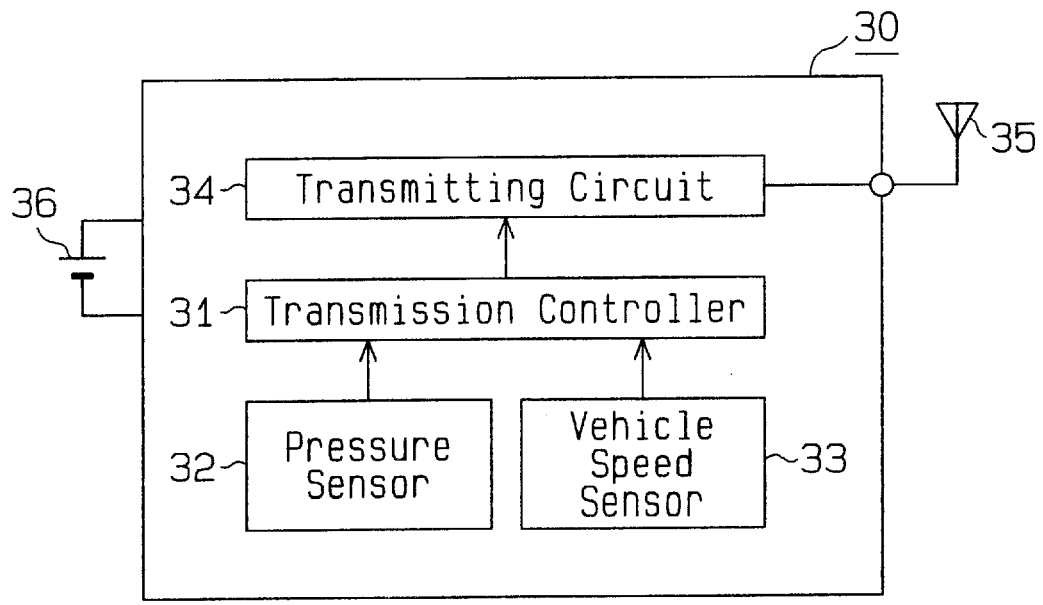
FIG. 2 is a block diagram showing a transmitter installed in the apparatus of FIG. 1.

With reference to FIG. 2, each of the transmitters 30 includes a transmission controller 31, which is formed by, for example, a microcomputer. The transmission controller 31 includes, for example, a central processing unit (CPU), a read only memory (ROM), and a random access memory (RAM). A specific identification (ID) code is pre-registered in an internal memory, for example, the ROM, of each transmitter 31. The identification codes enable the receiver 40 to identify the four transmitters 30, each of which corresponds to a different one of the tires 20.

Each transmitter 30 includes a pressure sensor 32 and a vehicle speed sensor 33. The pressure sensor 32 measures the air pressure of the associated tire 20 and transmits air pressure data based on the measurement to the transmission controller 31. The vehicle speed sensor 33 is, for example, an acceleration sensor or a so-called electrostatic capacity type motion sensor, which changes electrostatic capacity in relation to the centrifugal force generated by rotation of the associated tire 20. The vehicle speed sensor 33 provides the transmission controller 31 with a signal corresponding to the rotational speed of the tire 20, or a signal corresponding to the vehicle traveling speed.

Subsequently, the transmission controller 31 supplies a transmitting circuit 34 with data including a signal indicating the received air pressure data and the specific ID code registered in the internal memory of the transmitter 30. Also, the transmission controller 31 computes the traveling speed of the vehicle 10 (the vehicle traveling speed) based on the signal from the vehicle speed sensor 33. The transmission controller 31 then determines the bit rate of transmitted data depending on the vehicle traveling speed. Further, the transmitting circuit 34 encodes and modulates the data from the transmission controller 31 in accordance with the bit rate determined by the transmission controller 31. The transmission circuit 34 then wirelessly transmits the data by a transmitting antenna 35. Each transmitter 30 includes a battery 36, which powers the transmitter 30.

Figure 3:
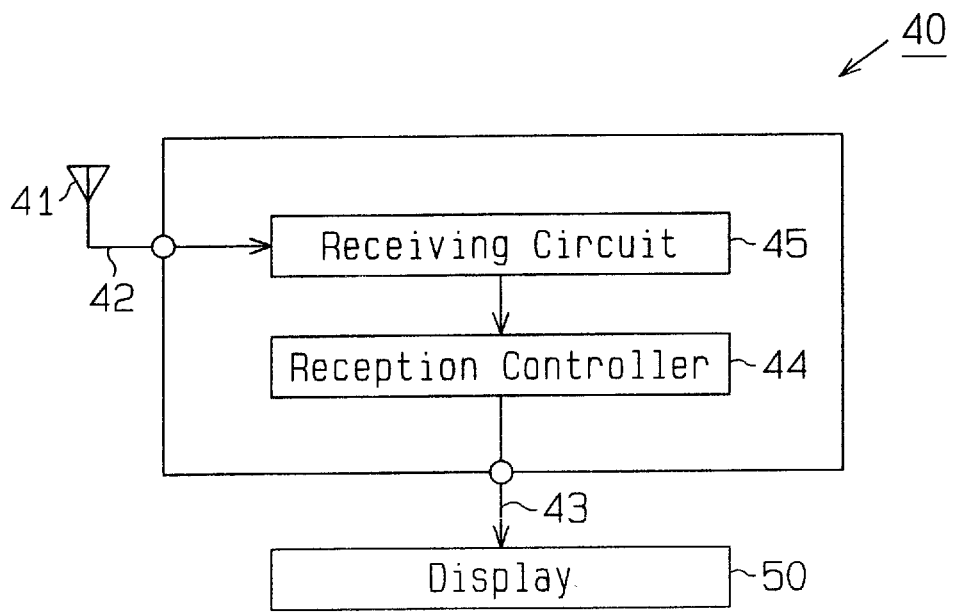
FIG. 3 is a block diagram showing a receiver installed in the apparatus of FIG. 1.

With reference to FIG. 3, the receiver 40 includes a reception controller 44 and a receiving circuit 45, which process data received by the receiving antenna 41. The reception controller 44, which is formed by, for example, a microcomputer, includes a CPU, an ROM, and an RAM.

The RAM stores the specific ID codes that identify the four transmitters 30 of the vehicle 10. When one of the transmitters 30 transmits data to the receiver 40, the receiving circuit 45 receives the data from the transmitter 30 by the receiving antenna 41. The receiving circuit 45 then demodulates and decodes the received data and then transmits the data to the reception controller 44.

Based on the received data, the reception controller 44 determines the air pressure of the tire 20 associated with the transmitter 30 that has transmitted the data, or the source of the data. The reception controller 44 then indicates air pressure data on the display 50. Particularly, if the air pressure of the tire 20 is not in an acceptable range, the reception controller 44 indicates a warning on the display 50.

Figure 4:
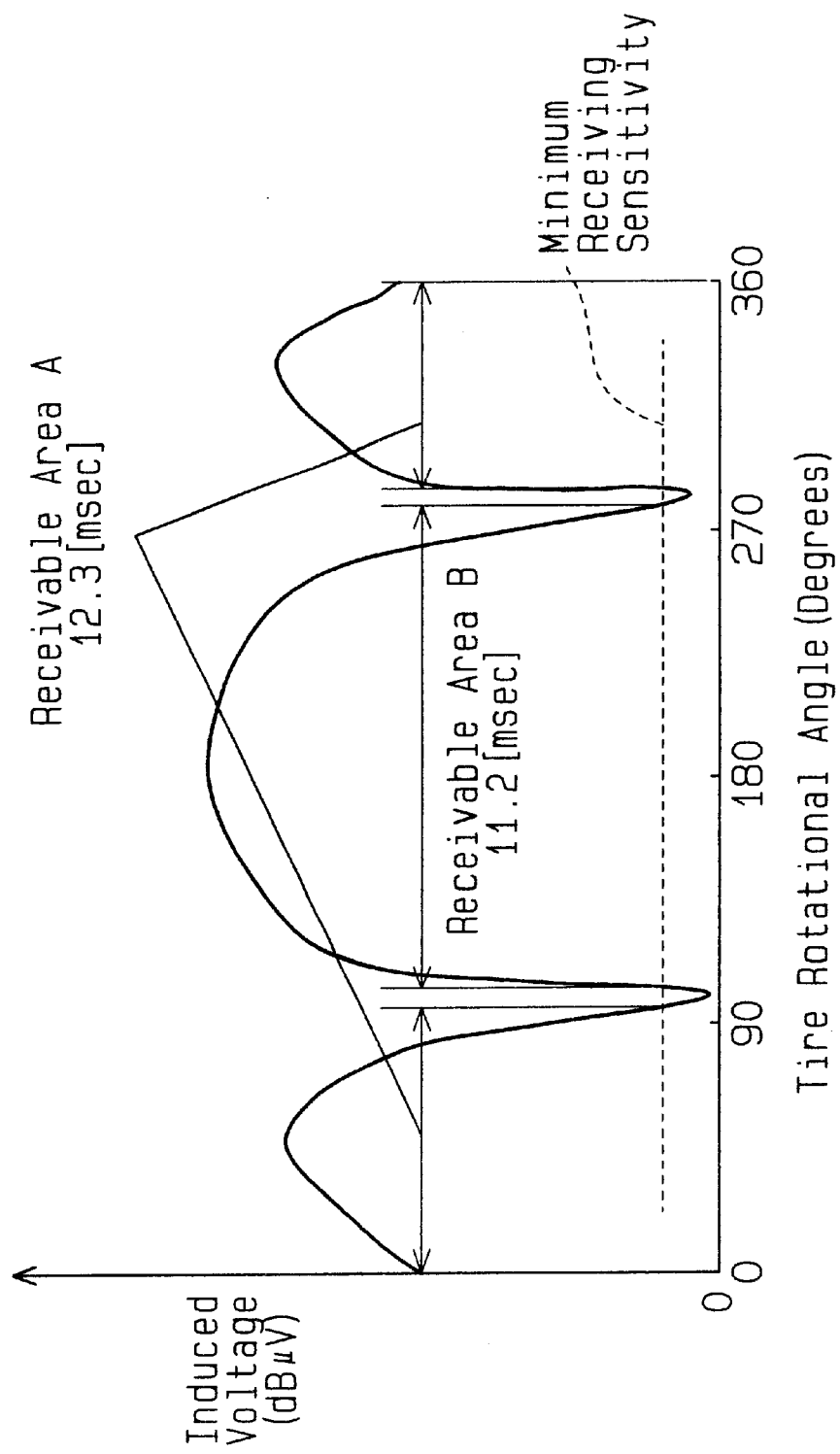
FIG. 4 is a graph representing a pattern of voltage level induced in a receiving antenna during one rotation cycle of a tire.

FIG. 4 is a graph indicating change of voltage level induced in the receiving antenna 41 by a radio wave from each transmitter 41 during a single rotation cycle of the tire 20 (hereafter, "an induced voltage pattern"). The induced voltage pattern includes an induced voltage area in which the induced voltage does not reach a level corresponding to a minimum receiving sensitivity of the receiver 40 (hereafter, "a null point"). If each tire 20 is size 245/40 and attached to an 18 inch wheel, each rotational cycle of the tire 20 is completed in approximately 24.6 milliseconds at the vehicle traveling speed of 300 km/h. In this case, with reference to FIG. 4, each rotation cycle of the tire 20 includes two induced voltage areas in which the minimum receiving sensitivity of the receiver 40 remains satisfied by the induced voltage, or two receivable induced voltage areas A, B. The receivable induced voltage area A corresponds to 12.3 milliseconds, and the receivable induced voltage area B corresponds to 11.2 milliseconds. If each transmitter 30 transmits 40 bit data at the bit rate of 1 kbps, a single data transmission cycle is completed in 40 milliseconds, which is longer than the time corresponding to each of the receivable induced voltage areas A, B, or 12.3 or 11.2 milliseconds. The data transmission cycle thus cannot avoid the null point, regardless of the timing at which the data transmission cycle is started. In this case, the receiver 40 cannot completely receive data.

In contrast, if each transmitter 30 transmits the 40 bit data at the bit rate of 20 kbps, a single data transmission cycle is completed in two milliseconds. In this case, depending on the timing at which the data transmission cycle is started, the transmission cycle may include the null point such that the receiver 40 cannot receive data. However, the data transmission time, or two milliseconds, is shorter than the time corresponding to either of the receivable induced voltage area A, B. Thus, as long as the data transmission cycle is completed without being affected by the null point, the receiver 40 receives complete data. Further, if each transmitter 30 repeatedly transmits the same data for several times during each data transmission cycle, the receivability of the receiver 40 is improved. That is, the receiver 40 further reliably receives the data from each transmitter 30.

Figures 5, 6:
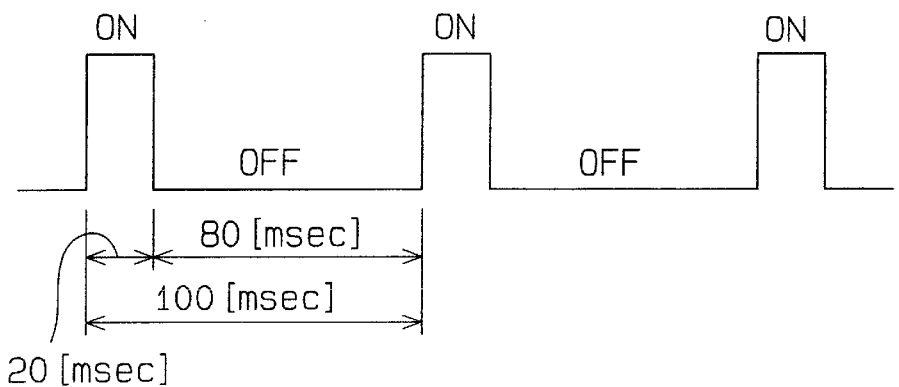
FIG. 5 is a table showing the relationship between vehicle traveling speed and receivability of the receiver.
FIG. 6 is a timing chart indicating intermittent operation of a transmitting circuit.

FIG. 5 is a table indicating the relationship between the traveling speed of the vehicle 10 and the receivability of the receiver 40. More specifically, the table indicates "the time corresponding to a single rotation cycle of each tire 20", "the time corresponding to the receivable induced voltage area A", "the time corresponding to the receivable induced voltage area B", "the receivability of the receiver 40 at the bit rate of 1 kbps", and "the receivability of the receiver 40 at the bit rate of 20 kbps", in relation to the traveling speed of the vehicle 10. The time corresponding to a single rotation cycle of each tire 20 is obtained based on the assumption that the tire 20 is size 245/50 and attached to an 18 inch wheel.

As is clear from FIG. 5, if the bit rate is 1 kbps and the traveling speed of the vehicle 10 is not higher than 80 km/h, the receiver 40 reliably receives transmitted data. However, if the bit rate is 1 kbps and the traveling speed of the vehicle 10 is 100 km/h or higher, the receiver 40 cannot receive transmitted data.

Further, if the bit rate is 20 kbps and the traveling speed of the vehicle 10 is at least 40 km/h, the receiver 40 reliably receives transmitted data. However, as described in "THE BACKGROUND OF THE INVENTION", the receiver 40 operates intermittently when the engine is stopped. This makes it difficult for the receiver 40 to reliably receive data at the bit rate of 20 kbps, which is relatively high.

Accordingly, to solve this problem, the bit rate of the transmitted data of this embodiment is variable, being set at 1 kbps when the traveling speed of the vehicle 10 is below 40 km/h and being set at 20 kbps when the traveling speed of the vehicle 10 is at least 40 km/h.

In other words, if the traveling speed of the vehicle 10 is below 40 km/h, each transmitter 30 transmits data at the bit rate of 1 kbps, such that the receiver 40 reliably receives the transmitted data. Further, if the traveling speed of the vehicle 10 is at least 40 km/h, each transmitter 30 transmits data at the bit rate of 20 kbps, such that the receiver 40 reliably receives the transmitted data.

The intermittent operation of the receiving circuit 45, which is performed when the engine of the vehicle 10 is stopped, will now be described. Whether the engine is stopped or not is judged depending on an ignition signal generated by a key switch of the vehicle 10. If the reception controller 44 determines that the engine is stopped based on the ignition signal, the intermittent operation of the receiving circuit 45 (an intermittent operation mode of the receiver 40) is started. In contrast, if the reception controller 44 determines that the engine is operating, the reception controller 44 maintains a continuous operation mode of the receiving circuit 45. That is, a constantly turned-on state of the receiving circuit 45 (a continuous operation mode of the receiver 40) is maintained. FIG. 6 schematically shows an intermittent operating pattern of the receiving circuit 45 when the engine of the vehicle 10 is stopped. As indicated by FIG. 6, the receiving circuit 45 is permitted to receive transmitted data, as long as the receiving circuit 45 is held in a turned-on state, which lasts 20 milliseconds.

As described, each transmitter 30 repeatedly transmits the same data for several times during a single data transmission cycle to avoid the null point. When the receiving circuit 45 in the turned-on state acknowledges that one of the transmitters 30 is transmitting data, the receiver 40 maintains the receiving circuit 45 in the turned-on state until after the receiver 40 completely receives the data, which is repeatedly transmitted by the transmitter 30.

The receiver 40 judges whether the received data has been transmitted by one of the transmitters 30 or not, as follows. That is, if the receiver 40 repeatedly receives a pulse with a predetermined width and then an 8 bit header (for example, a header formed by zeroes for eight consecutive bits), the receiver 40 determines that the received data has been transmitted by one of the transmitters 30.

If the receiving circuit 45 does not receive data from any of the transmitters 30 while being held in the turned-on state, the receiver 40 switches the receiving circuit 45 to a turned-off state, which lasts 80 milliseconds.

If each transmitter 30 repeatedly transmits 40 bit data at the bit rate of 1 kbps for six consecutive times during a single data transmission cycle, the data transmission cycle is completed in 240 milliseconds. With reference to FIG. 6, if the turned-on state lasts 20 milliseconds and the turned-off state lasts 80 milliseconds in the intermittent operation of the receiving circuit 45, the time needed for each data transmission cycle, or 240 milliseconds, is longer than the time corresponding to the turned-off state. Thus, the receiver 40 receives part of the data transmitted during each transmission cycle when the receiving circuit 45 is held in the turned-on state, which lasts 20 milliseconds. The receiver 40 then maintains the receiving circuit 45 in the turned-on state until after the receiver 40 completely receives the transmitted data. Accordingly, even during the intermittent operation of the receiving circuit 45 when the engine is stopped, the receiver 40 reliably receives data from the transmitters 30, as long as the bit rate is relatively low, or 1 kbps.

If each transmitter 30 repeatedly transmits 40 bit data at the bit rate of 20 kbps for six consecutive times during a single data transmission cycle, the data transmission cycle is completed in 12 milliseconds. That is, with reference to FIG. 6, the time needed for each data transmission cycle is shorter than the time corresponding to the turned-off state of the receiving circuit 45, 80 milliseconds. This makes it unlikely for the receiver 40 to receive data from the transmitters 30 when the receiving circuit 45 is held in the turned-on state, 20 milliseconds. Accordingly, if the receiver 40 operates intermittently when the engine is stopped, the receiver 40 cannot reliably receive data at the bit rate of 20 kbps, which is relatively high.

If the time needed for each cycle of the intermittent operation of the receiving circuit 45 is shortened without changing the time ratio between the two states, the receivability of the receiver 40 may be improved even if the bit rate of transmitted data is relatively high. However, when switched from the turned-off state, the turned-on state of the receiving circuit 45 becomes effective only after a predetermined time lag (approximately 2–10 milliseconds). This may make it impossible to sufficiently shorten the time needed for each cycle of the intermittent operation of the receiving circuit 45. It is thus most feasible that the receivability of the receiver 40 be improved by prolonging the time for which the receiving circuit 45 remains in the turned-on state during the intermittent operation. However, as described, this consumes more power of the battery, which is installed in the vehicle 10. Thus, it is optimal that each transmitter 30 repeatedly transmit 40 bit data at the bit rate of 1 kbps for several times during each transmission cycle as long as the engine is stopped.

The embodiment of FIGS. 1 to 6 has the following advantages.

When the traveling speed of the vehicle 10 is below 40 km/h, each transmitter 30 transits data at the bit rate of 1 kbps. When the traveling speed of the vehicle 10 is at least 40 km/h, each transmitter 30 transmits data at the bit rate of 20 kbps. When the engine is operating, the receiver 40 is maintained in the continuous operation mode, or in a constantly turned-on state, and receives transmitted data in this state. When the engine of the vehicle 10 is stopped, the receiver 40 is maintained in the intermittent operation mode and receives transmitted data in this state. Accordingly, when the engine is stopped, the receiver 40 stably receives data transmitted by the transmitters 30 while the battery power of the vehicle 10 is saved. As a result, regardless of the operational state of the engine of the vehicle 10, or regardless of whether the engine of the vehicle 10 is stopped or operating, the transmitters 30 transmit data to the receiver 40 constantly at an optimal bit rate.

If one of the transmitters 30 transmits data to the receiver 40 in the intermittent operation mode, the receiver 40 receives part of the data when the receiving circuit 45 is in the turned-on state. If the receiver 40 determines that the received data has been set by one of the transmitters 30, the receiving circuit 45 is maintained in the turned-on state until after the receiver 40 completely receives the transmitted data. Accordingly, even in the intermittent operation, the receiver 40 stably receives data from the transmitters 30.

The illustrated embodiment may be modified as follows.

The vehicle speed sensor 33 may be a so-called angular speed sensor, which detects an angular speed by an annular silicone oscillator.

The optimal bit rate can be determined as long as whether the traveling speed of the vehicle 10 is below 40 km/h or not is judged. Thus, the vehicle speed sensor 33 may be a switch that is selectively turned on and turned off, depending on whether the traveling speed of the vehicle 10 is below 40 km/h, which is a threshold value.

The threshold value, which is a reference value for changing the bit rate, is not restricted to 40 km/h. That is, a different value may be selected as the threshold value depending on the type of the vehicle 10 and the size of the wheels.

Alternatively, the bit rate may be changed among three levels in relation to the traveling speed of the vehicle 10. Also, the bit rate may be gradually changed in relation to the traveling speed of the vehicle 10.

Another embodiment of the present invention will hereafter be described with reference to FIGS. 7 to 10. The description focuses on the difference between the embodiment of FIGS. 1 to 6 and the embodiment of FIGS. 7 to 10.

In the embodiment of FIGS. 1 to 6, each transmitter 30 changes the bit rate of transmitted data in accordance with the traveling speed of the vehicle 10, which is detected by the vehicle speed sensor 33. In contrast, in the embodiment of FIGS. 7 to 10, each transmitter 30 transmits data while alternating different bit rates in each data transmission cycle, regardless of the vehicle traveling speed. In other words, the controller causes the variable bit rate to vary in a single data transmission cycle.

Figure 7:
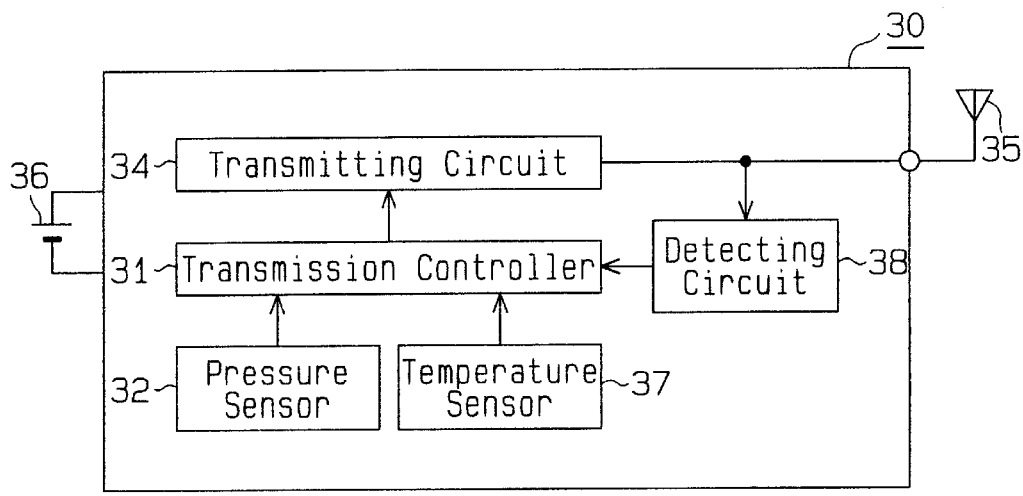
FIG. 7 is a block diagram showing a transmitter of a tire condition monitoring apparatus of another embodiment according to the present invention.

With reference to FIG. 7, the transmitters 30 of this embodiment are not provided with the vehicle speed sensors 33. Instead, each transmitter 30 of this embodiment includes a temperature sensor 37, which measures the temperature of the interior of the associated tire 20. Thus, each transmitter 30 transmits data including temperature data in addition to the air pressure data, as data indicating the condition of the tire 20. The transmitter 30 of FIG. 2 may also include the temperature sensor 37. The transmitters 30 of the embodiment of FIGS. 7 to 10 each include a detecting circuit 38, which detects a predetermined external signal received by the associated transmitting antenna 35.

Figure 8A:
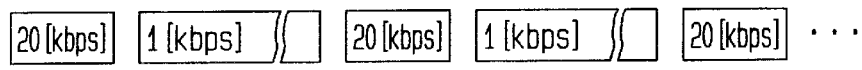
FIG. 8(a) is a view explaining data transmission at different bit rates in a single transmission cycle in another embodiment of the present invention.

With reference to FIG. 8(a), each transmitter 30 of this embodiment repeats five consecutive transmission subcycles during a single data transmission cycle. When transmitting data in each of the transmission subcycles, the transmitters 30 first employ the bit rate of 20 kbps and then the bit rate of 1 kbps. In other words, each transmitter 30 transmits the same data for ten consecutive times in each data transmission cycle while alternating the bit rates 20 kbps and 1 kbps.

If the bit count of the data is 40, the time needed for each data transmission cycle is 210 milliseconds (=two milliseconds×5+40 milliseconds×5). With reference to FIG. 6, as described, a single intermittent operating pattern of the receiving circuit 45 includes the turned-on state that lasts 20 milliseconds and the turned-off state that lasts 80 milliseconds. Thus, the time needed for each data transmission cycle, 210 milliseconds, is longer than the time corresponding to the turned-off state, 80 milliseconds. Accordingly, when one of the transmitters 30 transmits data to the receiver and the receiving circuit 45 is in the turned-on state, which lasts 20 milliseconds, the receiver 40 receives part of the data. The receiver 40 then maintains the receiving circuit 45 in the turned-on state until after the receiver 40 completely receives the transmitted data. As a result, even if the receiver 40 operates intermittently when the engine is stopped, the receiver 40 reliably receives data from the transmitters 30.

Further, as described about the embodiment of FIGS. 1 to 6, to enable the receiver 40 to optimally receive data from the transmitters 30, it is preferred that the bit rate of transmitted data be 1 kbps when the vehicle traveling speed is below 40 km/h and 20 kbps when the vehicle traveling speed is at least 40 km/h. However, in the embodiment of FIGS. 7 to 10, each transmitter 30 alternates the bit rates 1 kbps and 20 kbps during each data transmission cycle. Accordingly, the receiver 40 is constantly ensured to optimally receive data from the transmitters 30, without changing the bit rate in relation to the traveling speed of the vehicle 10.

Figure 8B:
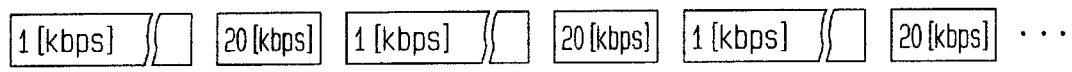
FIG. 8(b) is a view explaining data transmission at different bit rates in a single transmission cycle in another embodiment of the present invention.

Alternatively, with reference to FIG. 8(b), each transmission subcycle of the transmitters 30 may be started at the bit rate of 1 kbps, in contrast with FIG. 8(a).

An external control device 60 will now be described with reference to FIG. 9. The external control device 60 transmits a trigger signal for temporarily setting the transmitters 30 in a registration mode. In the registration mode, the receiver 40 registers the specific ID codes of the transmitters 30. When the receiver 40 is not operating in the registration mode (or is in a normal operation mode), the transmitters 30 transmit data at predetermined time intervals. That is, in the normal operation mode, the transmitters 30 transmit data in the manners illustrated in FIGS. 8(a) or 8(b).

Figure 9:
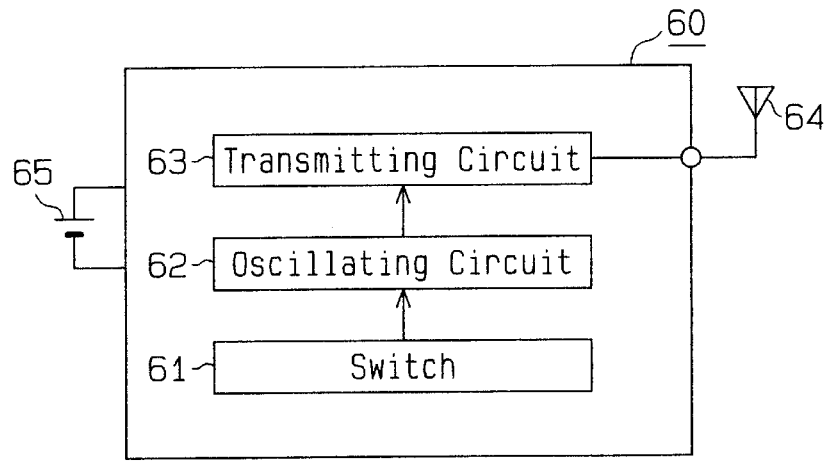
FIG. 9 is a block diagram showing an external control device of another embodiment of the present invention.

With reference to FIG. 9, the external control device 60 includes a switch 61, an oscillating circuit 62, and a transmitting circuit 63. The switch 61 temporarily sets the transmitters 30 in the registration mode. The oscillating circuit 62 generates an oscillating signal for setting the transmitters 30 in the registration mode when the switch 61 is manipulated. The transmitting circuit 63 generates a trigger signal as an external signal in response to the oscillating signal of the oscillating circuit 62. The transmitting circuit 63 transmits the trigger signal by a transmitting antenna 64. A battery 65 powers the external control device 60. It is preferred that the external control device 60 be portable.

A procedure for registering the ID codes of the transmitters 30 by the external control device 60 will hereafter be described.

First, the external control device 60 is placed in the vicinity of one of the transmitters 30, which is attached to the associated tire 20 of the vehicle 10. The switch 61 of the external control device 60 is then manipulated to send the trigger signal by the transmitting antenna 64. The trigger signal is detected by the detecting circuit 38 of the transmitter 30, which is located in the vicinity of the external control device 60. The transmission controller 31 of the transmitter 30 then determines that the trigger signal has been detected. The transmitter 30 is thus set in the registration mode and transmits data including the specific ID code by the transmitting antenna 35.

Figure 10:
FIG. 10 is a view explaining transmitted data during a registration mode in another embodiment of the present invention.

In the registration mode, the transmitters 30 transmit data in a different manner from that of the normal operation mode, with reference to FIG. 10, for example. More specifically, in the registration mode, the transmitters 30 repeat a predetermined number of (for example, two) transmission subcycles during each data transmission cycle. In each of the transmission subcycle, the transmitters 30 transmit the same data at the bit rate of 1 kbps for two consecutive times and then at the bit rate of 20 kbps for two consecutive times.

On receiving data from one of the transmitters 30, the receiver 40 judges whether the received data has been transmitted in accordance with the registration mode or the normal operation mode, depending on the pattern in which the bit rates of the transmitted data are combined. If the bit rate combination pattern of the received data corresponds to the normal operation mode, the receiver 40 compares the ID code included in the transmitted data with the four ID codes stored in the RAM of the reception controller 44. If the received ID code matches one of the stored ID codes, the receiver 40 continuously processes the received data to monitor the condition of the associated tire 20. More specifically, the receiver 40 extracts information including the air pressure data from the received data and indicates the information on the display 50 as needed.

In contrast, if the bit rate combination pattern of the received data corresponds to the registration mode, the receiver 40 causes the RAM of the reception controller 44 to register the ID code extracted from the data.

This ID code registering procedure is repeated for all of the tires 20 such that the receiver 40 registers the four ID codes, each of which corresponds to a different one of the four transmitters 30 installed in the vehicle 10. When the data transmission in accordance with the registration mode is ended, the transmitters 30 resume the normal operation mode to transmit data at predetermined time intervals.

The embodiment of FIGS. 7 to 10 has the following advantages, in addition to those of the embodiment of FIGS. 1 to 6.

In the embodiment of FIG. 7 to 10, instead of changing the bit rate of transmitted data in relation to the vehicle traveling speed, the transmitters 30 transmit data while alternating different bit rates during each data transmission cycle, regardless of the vehicle traveling speed. It is thus unnecessary to provide the transmitters 30 with vehicle speed sensors. This simplifies the structure of each transmitter 30 and reduces the manufacturing cost of the transmitters 30.

When the ID codes of the transmitters 30 are registered in the receiver 40, the external control device 60 enables the transmitters 30 to transmit data needed for registering the ID codes to the receiver 40. That is, for example, it is unnecessary to manually switch the receiver 40 to the registration mode for registering the ID codes of the transmitters 30. The external control device 60 thus makes it easy to register the ID codes of the transmitters 30 in the receiver 40.

The content of the data transmitted by the transmitters 30 in the registration mode may be the same as that of the data transmitted by the transmitters 30 in the normal operation mode. In other words, the data transmitted by the transmitters 30 in the registration mode may include the specific ID code, pressure data, and temperature data, like that of the normal operation mode. In this case, the only difference between the data corresponding to the registration mode and the data corresponding to the normal operation mode is in the bit rate combination patterns. This simplifies configuration and controlling for data transmission, leading to lower costs.

Further, in the embodiment of FIGS. 1 to 6, the ID codes of the transmitters 30 may be registered in the receiver 40 in the same manner as in the embodiment of FIGS. 7 to 10. That is, as set in the registration mode, the transmitters 30 transmit data at bit rates different from those of the normal operation mode to enable the receiver 40 to register the ID codes, which are included in the transmitted data.

The embodiment of FIGS. 1 to 7 may be modified as follows.

In the illustrated embodiment, each data transmission cycle is completed by repeating five consecutive transmission subcycles, in each of which the bit rate of transmitted data is switched from 20 kbps to 1 kbps. However, the number of transmission subcycles performed in each data transmission cycle may be changed.

The combination of the bit rates employed in each data transmission cycle is not restricted to those illustrated in the drawings but may be changed as needed.

The bit rate of transmitted data may be switched among three or more levels during each data transmission cycle.

Further, the embodiment of FIGS. 1 to 6 and the embodiment of FIGS. 7 to 10 may be modified as follows.

The receiver 40 may include a plurality of receiving antennas 41, each of which is associated with a different one of the tires 20.

A sound alarm device may be provided for warning the driver of a non-normal air pressure of the tires 20. The sound alarm device may be a conventional speaker provided in the vehicle 10.

The air pressure data transmitted by each transmitter 30 may include, for example, a specific value of the air pressure of the associated tire 20. Alternatively, the data may only indicate whether the air pressure of the tire 20 is in an acceptable range or not.

A temperature sensor may be provided in each transmitter 30. In this case, the data wirelessly transmitted by the transmitter 30 includes data indicating the temperature of the interior of the associated tire 20, in addition to the air pressure data.

The tire condition monitoring apparatus of the present invention may be applied to vehicles other than four wheel vehicles. That is, the apparatus may be applied to two wheel vehicles, such as bicycles and motorbikes, or buses or trucks or industrial vehicles (for example, forklifts).

The intermittent operation of the receiver 40, which is performed when the engine of the vehicle 10 is stopped, may be performed also when the vehicle 10 is stopped, or the engine of the vehicle 10 is idling. This saves the battery power even during the engine idling, which reduces the power generation of the power generator of the vehicle 10.

The present examples and embodiments are to be considered as illustrative and not restrictive and the invention is not to be limited to the details given herein, but may be modified within the scope and equivalence of the appended claims.

What is claimed is:

1. A transmitter of an apparatus for monitoring the condition of a tire attached to a vehicle, comprising:
   a tire condition sensor, wherein the tire condition sensor measures a parameter indicating the condition of the tire;
   a transmitting circuit, wherein the transmitting circuit wirelessly transmits, at a variable bit rate, data representing the measured parameter; wherein the transmitted data indicates the condition of the associated tire regardless of the operation mode of the vehicle and
   a controller, associated with the transmission circuit, wherein the controller controls the variable bit rate of the data transmitted by the transmitting circuit.

2. The transmitter according to claim 1, further comprising a vehicle speed sensor, wherein the vehicle speed sensor detects a traveling speed of the vehicle, and the controller controls the variable bit rate depending on the detected traveling speed.

3. The transmitter according to claim 2, wherein the controller controls the variable bit rate depending on whether the detected traveling speed is below a predetermined speed or is at least the predetermined speed.

4. The transmitter according to claim 3, wherein the controller controls the variable bit rate to be lower when the detected traveling speed is below the predetermined speed than when the detected traveling speed is at least the predetermined speed.

5. The transmitter according to claim 1, wherein the controller causes the transmitting circuit to transmit data repeatedly in a single data transmission cycle.

6. The transmitter according to claim 1, wherein the controller causes the variable bit rate to vary in a single data transmission cycle.

7. An apparatus for monitoring the condition of a tire attached to a vehicle having an engine, comprising:
   a transmitter, which is attached to the tire, wherein the transmitter includes:
      a tire condition sensor, wherein the tire condition sensor measures a parameter indicting the condition of the tire;
      a transmitting circuit, wherein the transmitting circuit wirelessly transmits, at a variable bit rate, data representing measured parameter; the transmitter having a specific identification code, transmits the identification code together with the data representing the measured parameter, operates in a normal operation mode for transmitting the data at predetermined time intervals or a registration mode for transmitting the data in response to a predetermined external signal, and transmits the data at a different combination of bit rates in the registration mode from that of the normal operation mode; and
      when receiving the data from the transmitter, the receiver determines which mode the transmitter is operating in based on a pattern of the bit rate combination of the data, and if the transmitter is determined to be operating in the registration mode, the receiver registers the identification code, which is included in the received data; and
      a controller, associated with the transmission circuit, wherein the controller controls the variable bit rate of the data transmitted by the transmitting circuit; and
   a receiver, wherein the receiver receives and processes the transmitted data.

8. The apparatus according to claim 7, wherein the transmitter further includes a vehicle speed sensor for detecting a traveling speed of the vehicle, and the controller controls the variable bit rate depending on the detected traveling speed.

9. The apparatus according to claim 8, wherein the controller controls the variable bit rate depending on whether the detected traveling speed is below a predetermined level or is at least the predetermined speed.

10. The apparatus according to claim 9, wherein the controller controls the variable bit rate to be lower when the detected traveling speed is below the predetermined speed than when the detected traveling speed is at least the predetermined speed.

11. The apparatus according to claim 7, wherein the controller causes the transmitting circuit to transmit data repeatedly in a single data transmission cycle.

12. The apparatus according to claim 7, wherein the controller causes the variable bit rate to vary in a single data transmission cycle.

13. The apparatus according to claim 12, wherein the controller causes the variable bit rate to switch in the single data transmission cycle between a first bit rate and a second bit rate, wherein the first bit rate is lower than the second bit rate.

14. The apparatus according to claim 12, further comprising an external control device, wherein the external control device transmits the external signal to the transmitter, and the transmitter includes a detecting circuit for detecting the external signal.

15. The apparatus according to claim 7, wherein the receiver operates in a continuous operation mode for constantly enabling data reception when the engine is operating, and the receiver operates in an intermittent operation mode for intermittently enabling the data reception when the engine is stopped.

16. The apparatus according to claim 15 wherein, in the intermittent operation mode, the receiver is switched between a turned-on state and a turned-off state at predetermined time intervals, and if the receiver in the turned-on state receives the data from the transmitter, the receiver is maintained in the turned-on state until after the receiver completely receives the data, regardless of a predetermined time for which the receiver should remain in the turned-on state.

17. A method for monitoring the condition of a tire attached to a vehicle, comprising the steps of:

measuring a parameter indicating the condition of the tire;

wirelessly transmitting, at a variable bit rate, data representing the measured parameter; and varying the variable bit rate of the transmitted data in accordance with a traveling speed of the vehicle.

18. A method for monitoring the condition of a tire attached to a vehicle, comprising the steps of:

measuring a parameter indicating the condition of the tire; and wirelessly transmitting data representing the measured parameter at more than one bit rate indicating data regardless of the operation mode of the vehicle.

* * * * *